US005598594A

United States Patent [19]
Milliken et al.

[11] Patent Number: 5,598,594
[45] Date of Patent: Feb. 4, 1997

[54] SPILL CONTAINMENT RAMP

[75] Inventors: John O. Milliken, Gates Mills; Darel Taylor, Chardon, both of Ohio

[73] Assignee: ENPAC Corporation, Chardon, Ohio

[21] Appl. No.: 461,058

[22] Filed: Jun. 5, 1995

[51] Int. Cl.⁶ .............................. E01F 5/00; E01D 1/00
[52] U.S. Cl. .................................. 14/69.5; 254/88; 404/2
[58] Field of Search ............................ 14/69.5; 404/2, 404/3; 254/88; 134/123

[56] References Cited

U.S. PATENT DOCUMENTS

| 4,300,721 | 11/1981 | Rich | 404/2 X |
|---|---|---|---|
| 4,836,501 | 6/1989 | Baer | 254/88 |
| 5,033,146 | 7/1991 | Fogarty et al. | 14/69.5 |
| 5,118,081 | 6/1992 | Edelman | 254/88 |
| 5,176,361 | 1/1993 | Ayala, III | 254/88 |

FOREIGN PATENT DOCUMENTS

| 480155 | 1/1952 | Canada | 14/69.5 |

*Primary Examiner*—James A. Lisehora
*Attorney, Agent, or Firm*—Pearne, Gordon, McCoy & Granger

[57] ABSTRACT

A ramp for loading containers on or loading containers from an elevated surface provides a collection space for containing spillage on the ramp. The ramp is wedge-shaped and has an upper inclined load carrying wall and a bottom wall joining the load carrying wall at one end thereof. Sidewalls and an end wall join the load carrying and bottom walls to define an internal containment chamber. At least one drain opening is provided in the load carrying wall for collecting and for directing any spillage on an upper surface of the load carrying wall to the internal containment chamber.

12 Claims, 3 Drawing Sheets

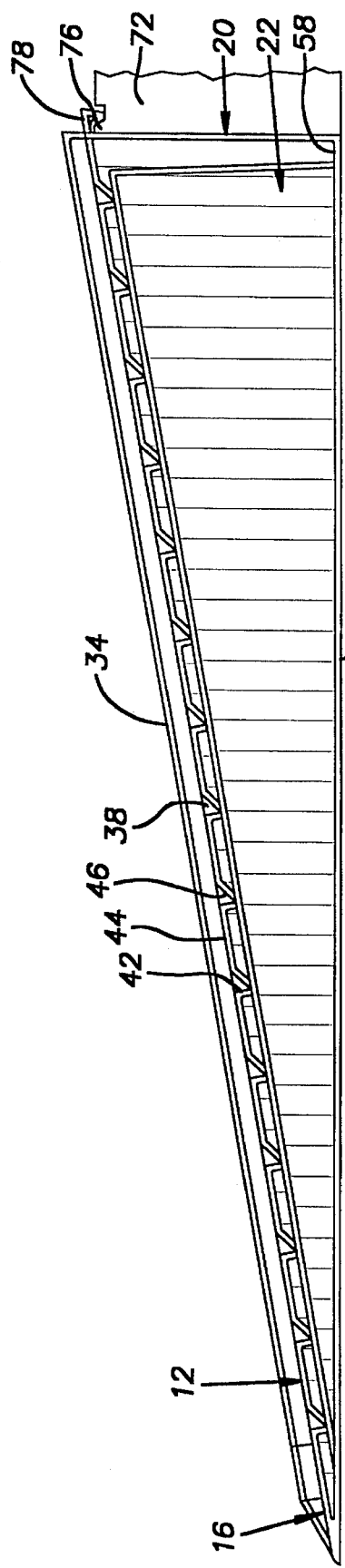
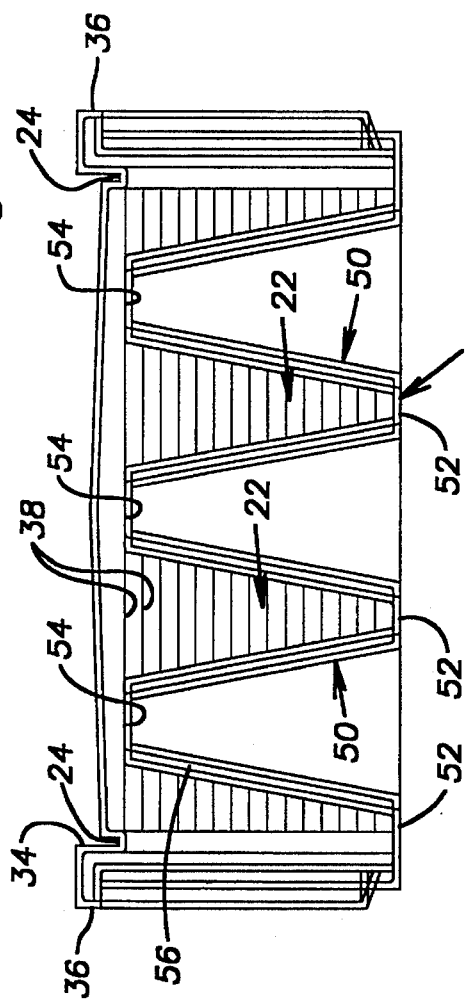

SPILL CONTAINMENT RAMP

BACKGROUND OF THE INVENTION

This invention relates to spill containment ramps and, more particularly, to ramps for loading containers onto or unloading containers from an elevated surface such as a storage pallet and for collecting and containing any spillage on the ramp during transport of the containers.

Proper toxic waste management includes the careful handling of drums during the transportation of the drum to and from the decks of storage containment pallets. The drum is usually transported by a hand cart to the pallet deck along a conventional aluminum loading ramp which is placed adjacent the pallet. Spills may occur while the drum is being transported up or down the ramp and those spills are conveyed by the ramp to the ground or floor.

BRIEF DESCRIPTION OF THE INVENTION

This invention provides a loading ramp for the transport of drums to the deck of a spill containing pallet which itself acts as a spill containment system by channeling spills to an interior containment chamber.

According to this invention a ramp for loading containers on or unloading containers from an elevated surface such as the deck of a containment pallet comprises a wedge shaped ramp having an inclined upper load carrying wall, a bottom wall having a ground engaging portion joining the load carrying wall at one end thereof, sidewalls joining the load carrying wall and the bottom wall, and an end wall joining the side walls, the load carrying walls and the ground engaging bottom wall. The walls define an internal containment chamber. Lateral edges of the upper surface of the ramp define longitudinal gutters to collect spillage and a drain opening is provided in each gutter to permit any spillage to enter the containment chamber. Dams are provided downstream of the opening to encourage spillage to enter the drain openings and to prevent spillage from flowing onto the floor or ground. According to preferred aspects of this invention, the upper surface of the ramp is provided with laterally extending treads and the side and end wall are corrugated to strengthen the structure. Further according to preferred aspects of this invention the bottom wall is provided with a plurality of upwardly extending ribs which further strengthen the structure.

BRIEF DESCRIPTION OF THE DRAWINGS

FIG. 3 is a cross sectional view, the plane of the section being indicated by the line 3—3 in FIG. 2

FIG. 5 is a cross sectional view from the plain of the section being indicated by the line 5—5 in FIG. 2.

DETAILED DESCRIPTION OF THE INVENTION

Figure 1:
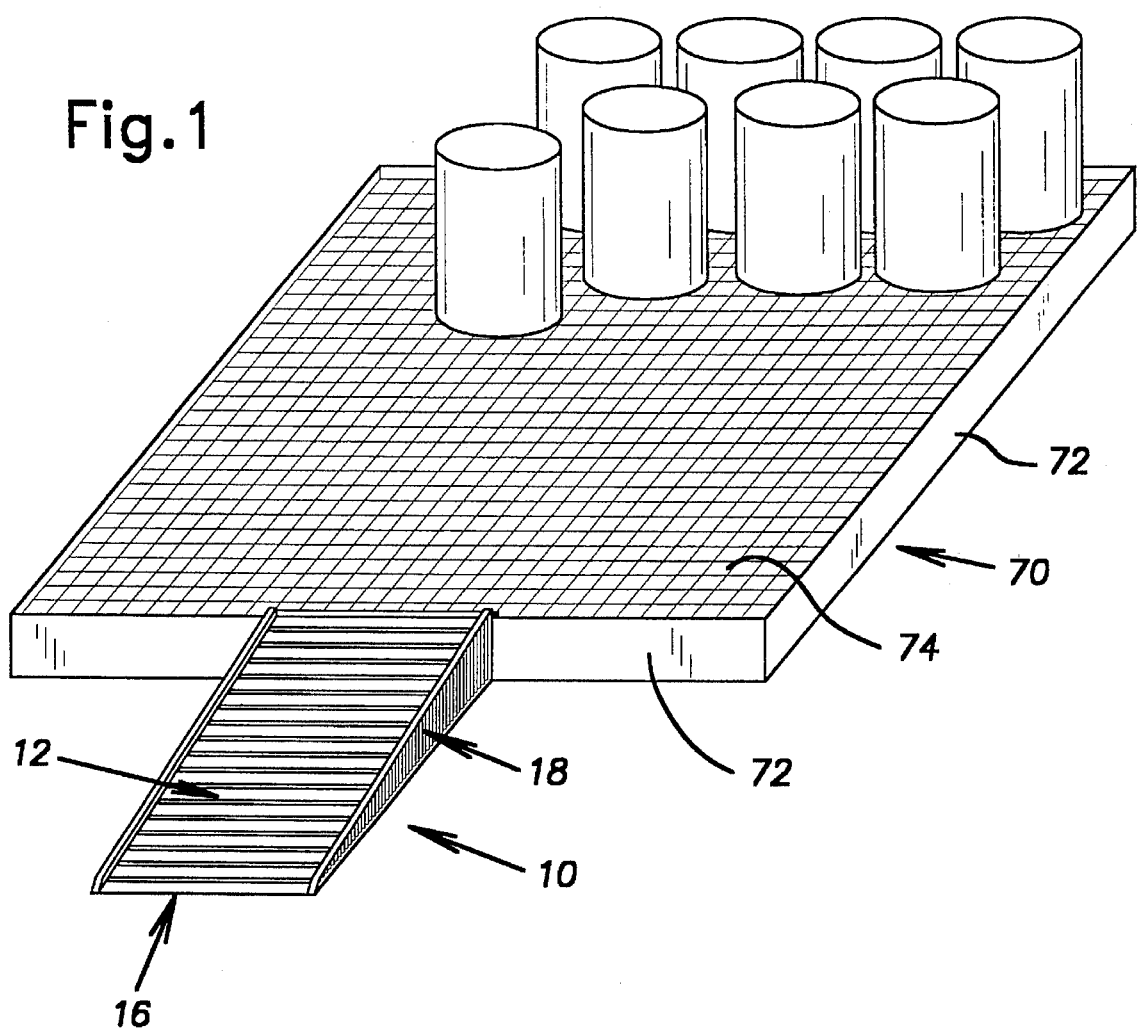
FIG. 1 is a perspective view of a ramp according to this invention illustrating the ramp attached to a spill collecting storage pallet.
Figure 4:
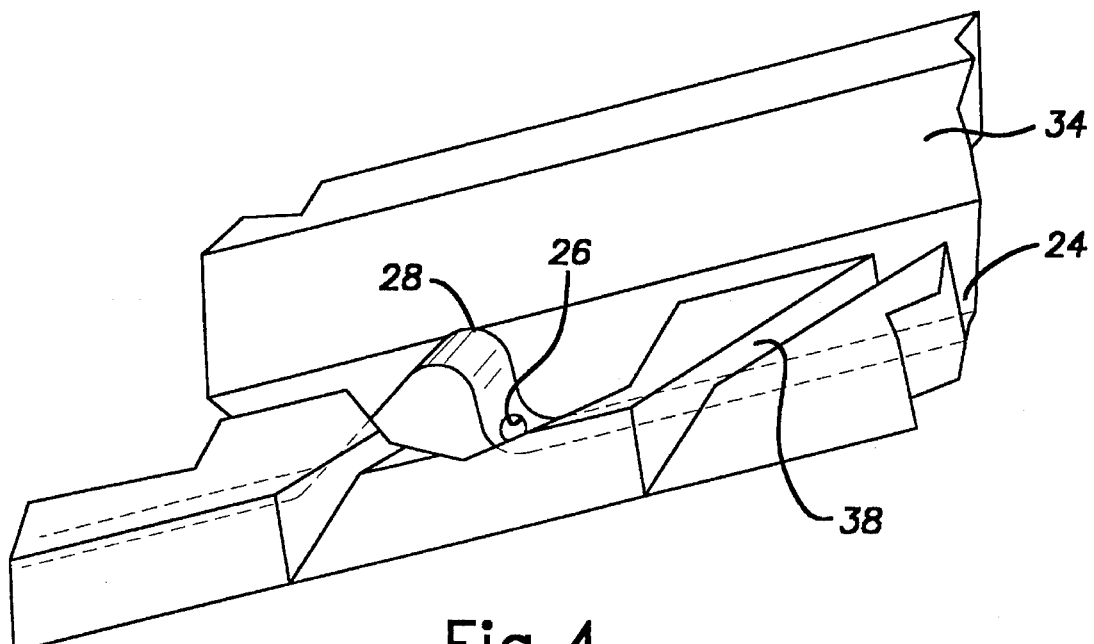
FIG. 4 is an enlarged fragmentary perspective view of a drain opening.

Referring now to the drawings, a spill containment ramp 10 is illustrated. The ramp 10 is wedge shaped and has an inclined upper load carrying wall 12. The ramp 10 further includes a bottom wall 14 joining the load carrying wall 12 at one end 16 thereof and side walls 18 which extent from the end 16 to an end wall 20 which joins the side walls 18. The walls 12, 14, 18, and 20 define a containment chamber 22.

The load carrying wall 12 defines longitudinal gutters 24 adjacent lateral edges thereof to convey spillage from upstream locations to downstream locations on the wall 12. A pair of drain openings 26 is located in the wall 12 and each drain opening 26 is situated just upstream of a dam 28 which minimizes further downward flow of any spillage. Additional dams 30 and 32 may be provided to collect spillage downstream of the dam 28.

The lateral edges of the ramp comprise raised side rails 34 which prevent roll-off of carts of dollies transporting containers on the ramp. The rails 34 have outwardly extending flanges 36 so that the ramp may be easily grasped to transport the ramp from location to location.

The upper surface of the wall 12 further defines a plurality of transverse valleys 38 which connect the longitudinal gutters 24 and, with the gutters 24, define a plurality of transverse, raised treads 40. Each valley 38 and, therefore, each tread 40 is defined by a first wall 42 perpendicular to an upper surface 44 of a tread 40 and a second wall 46 sloping upwardly to an upper surface 44 of an adjacent tread 40. This configuration of the transverse valleys provides a gripping surface for the wall 12 and provides lateral dispersion to the gutters of any spillage on the wall 12.

Figure 2:
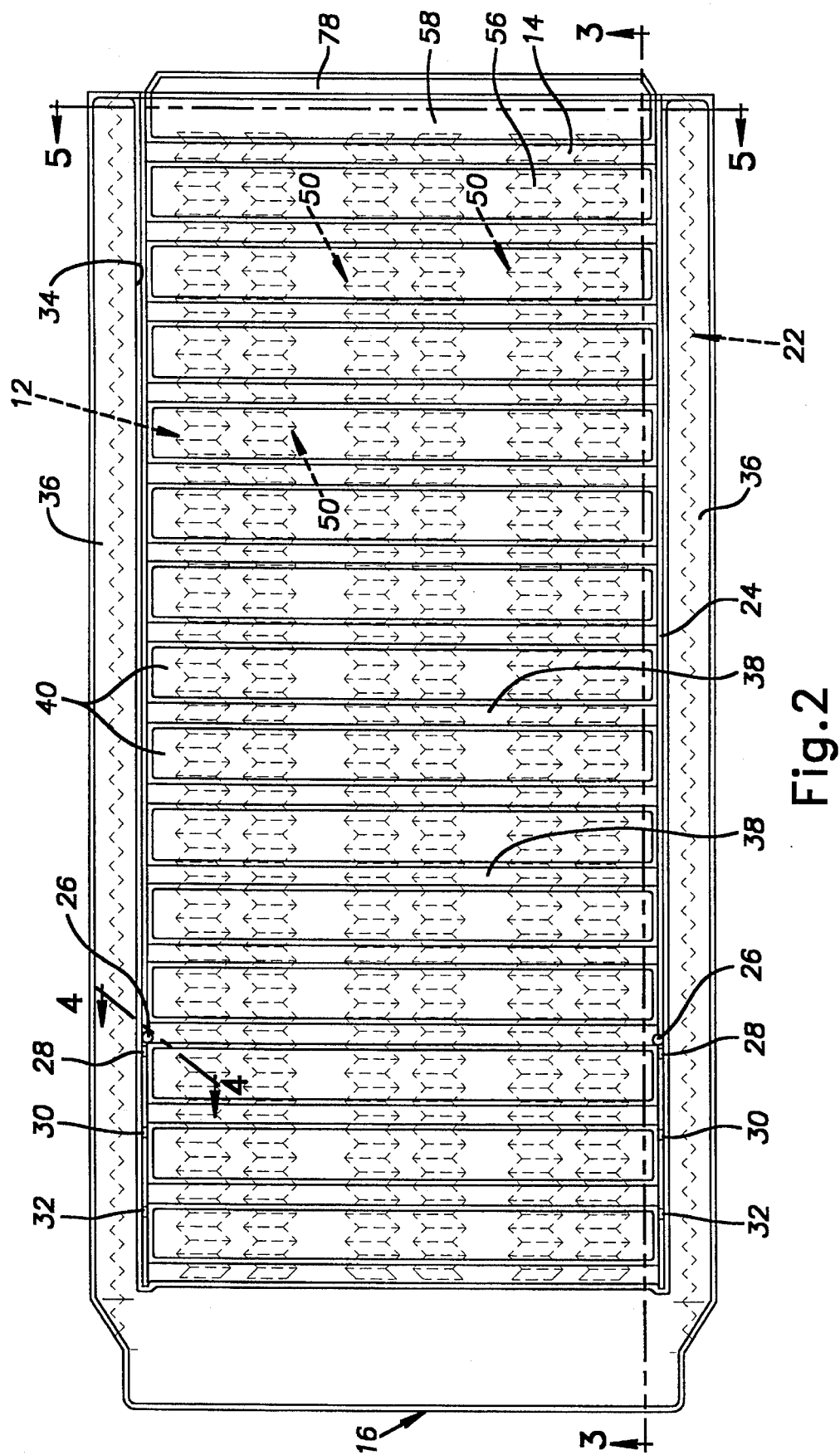
FIG. 2 is a top view of the ramp.

Referring now to FIGS. 2 and 5, the bottom wall 14 defines a plurality of ribs 50 which extend upwardly from ground engaging portions 52 of the bottom wall to upper portions 54. The upper portions 54 are fused or bonded to the lower edges of the transverse valleys 38 to provide rigidity to the structure. The ribs 50 have side walls 56 which taper upwardly toward the transverse valleys 38 and the side walls 56 taper from the end wall 20 toward the intersection 16 between the bottom wall 14 and the upper wall 12 to provide lateral stability to the structure. Further the walls 56 are corrugated for stiffening purposes.

The ground engaging portion 52 of the bottom wall 14 forms the bottom wall of the containment chamber 22 and has a transverse planer portion 58 adjacent the end wall 20 so as to connect the spaces between the upwardly extending ribs 50.

To further stiffen the structure the side walls 18 are corrugated.

As may be seen in FIG. 1 the ramp 10 is normally employed with a containment pallet 70 which comprises a containment reservoir defined by side walls 72 which support a drum receiving rib 74 the ramp 10 is removable attached to an upper lip 76 of a side wall 72 by a projecting hook 78 formed in the ramp 10.

Although the preferred embodiments of this invention have been shown and described, it should be understood that various modifications and rearrangements of the parts may be resorted to without departing from the scope of the invention as disclosed and claimed herein.

What is claimed is:

1. A ramp for loading containers on or unloading containers from an elevated surface and for collecting and containing spillage on the ramp comprising a wedge-shaped ramp having an inclined upper load carrying wall, a bottom wall having a ground engaging portion joining the load carrying wall at one end thereof, side walls joining the load carrying and bottom walls, and an end wall joining the sidewalls, the load carrying wall and the ground engaging bottom wall, said walls defining an internal containment chamber, at least one drain opening in said load carrying wall for collecting and for directing any spillage on an upper surface of said load carrying wall to said internal containment chamber, said upper surface defining longitudinal gutters adjacent lateral edges thereof to convey spillage from upstream locations to downstream locations, said at least one drain opening being located in at least one of said gutters and said ramp further including a dam adjacent each said at least one drain opening downstream of each said at least one drain opening.

2. A ramp according to claim 1 wherein said upper surface further defines a plurality of transverse valleys connecting said longitudinal gutters and with said gutters defining a plurality of transverse raised treads.

3. A ramp according to claim 2 wherein each valley is defined by a first wall perpendicular to an upper surface of a tread and a second wall sloping upwardly to an upper surface of an adjacent tread.

4. A ramp according to claim 2 wherein said bottom wall defines a plurality of ribs which extend upwardly from the ground engaging portion of said bottom wall and which have upper portions fused to said transverse valleys.

5. A ramp according to claim 4 wherein said ribs have side walls which taper upwardly toward said transverse valleys.

6. A ramp according to claim 5 wherein the side walls of said ribs are corrugated.

7. A ramp according to claim 6 wherein said ribs taper from said end wall toward an intersection between said ground engaging portion of said bottom wall and said upper load-carrying wall.

8. A ramp according to claim 7 wherein said ground engaging portion of said bottom wall defines a fluid interconnection between and around said ribs.

9. A ramp according to claim 1 wherein said side walls are corrugated.

10. A ramp according to claim 1 wherein said lateral edges comprise raised side rails to prevent roll-off of containers traversing the ramp and to provide spill containment.

11. A ramp according to claim 10 wherein an upper portion of each of said side rails has an outwardly extending flange to provide hand holds for transporting said ramp.

12. A ramp according to claim 1 wherein said end wall includes an upper edge provided with hook means to connect said ramp to a pallet.

* * * * *